United States Patent [19]

Dinteman

[11] Patent Number: 4,956,798

[45] Date of Patent: Sep. 11, 1990

[54] ARBITRARY WAVEFORM GENERATOR WITH ADJUSTABLE SPACING

[75] Inventor: Bryan J. Dinteman, Aloha, Oreg.

[73] Assignee: Tektronix, Inc., Beaverton, Oreg.

[21] Appl. No.: 389,076

[22] Filed: Aug. 3, 1989

[51] Int. Cl.⁵ .................... G06F 1/02; G06F 101/00
[52] U.S. Cl. .................................................... 364/718
[58] Field of Search ............................... 364/718–721

[56] References Cited

U.S. PATENT DOCUMENTS 4,669,024 5/1987 Stacey ................................. 364/721
4,719,593 1/1988 Threewitt et al. ................. 364/718
4,791,384 12/1988 Mackey et al. .................... 364/718

Primary Examiner—Dale M. Shaw
Attorney, Agent, or Firm—Francis I. Gray

[57] ABSTRACT

An arbitrary waveform generator using packet data words to represent segments of a desired complex waveform includes a variable clock. Each packet data word contains a clock control word that is used to control the variable clock frequency so that the duration of each segment is adjusted to produce the desired complex waveform.

13 Claims, 2 Drawing Sheets

ARBITRARY WAVEFORM GENERATOR WITH ADJUSTABLE SPACING

BACKGROUND OF THE INVENTION

The present invention relates to arbitrary waveform generators, and more particularly to an arbitrary waveform generator with adjustable spacing of points and segments to arrange precise time durations.

Arbitrary waveform generators are used to create arbitrary waveforms with direct digital synthesis. The arbitrary waveforms are then input to various devices under test to determine whether their responses lie within acceptable tolerances. For example noisy signals may be used to test the noise rejection capabilities of a device under test, or variable frequency waveforms may be used to test the frequency response of a device under test.

One method of waveform data generation uses a packetized data structure that defines segments of a main waveform memory by parameters that specify starting and ending addresses, number of repeats and next packet selections. This allows a given complex waveform to be broken into individual segments representing unique portions of the waveform function. This technique reduces the overall memory requirements for a given waveform by allowing repetitive sections to be compressed in the memory and recalled in a random manner with repeat capability to stretch lengths and provide for bursts of similar structures.

A problem with this method is that there is a relationship between the number of points required to adequately specify a given waveshape and the period those points are required to be spaced over. In differing portions of a complex waveshape these requirements alter so that a single choice of either frequency of point progression or number of points cannot adequately cover all portions. In many cases this is compounded by the practice of using interleaved memory as a method of increasing the maximum frequency of point progression so that the interpoint spacings are reduced for higher frequency actual output waveforms. The choice of number of points is degraded by the number of interleaves since there are now discrete choices where pattern bounds must be arranged to meet.

As an example, if there is a defined waveform portion having 20 points at 100 nsec intervals for a total of 2.0 usec, and that portion is required to be only 1.94 usec in duration, then the choice is between 20 points or 19 points for a 1.9 usec duration. Thus the choice is either to accept a period 60 nsec too long or 40 nsec too short. But if the next waveform segment is exactly correct at 100 nsec intervals, then there is not a fixed clock rate that will satisfy both requirements for the different waveform portions. This example is further compounded when memory interleaving is performed because now, instead of having a choice of one more or one less clock interval, the choice is between four more or less, or eight more or less, depending upon the memory interleave depth.

Therefore what is desired is a method of arbitrary waveform generation with adjustable spacing so that a unique choice of both frequency of point progression and number of points may be made for each portion of a complex waveform shape.

SUMMARY OF THE INVENTION

Accordingly the present invention provides an arbitrary waveform generator with adjustable spacing that makes use of a control field added to a data packet. The control field contains data that specifies a clock rate to be used during that data packet in the waveform. A variable clock, having a master clock input, provides an output clock frequency that is determined by clock rate data from the control field so that each waveform segment data packet is tailored to produce the desired number of points in a desired amount of time.

The objects, advantages and other novel features of the present invention are apparent from the following detailed description when read in conjunction with the appended claims and attached drawing.

DESCRIPTION OF THE PREFERRED EMBODIMENT

Figure 1:
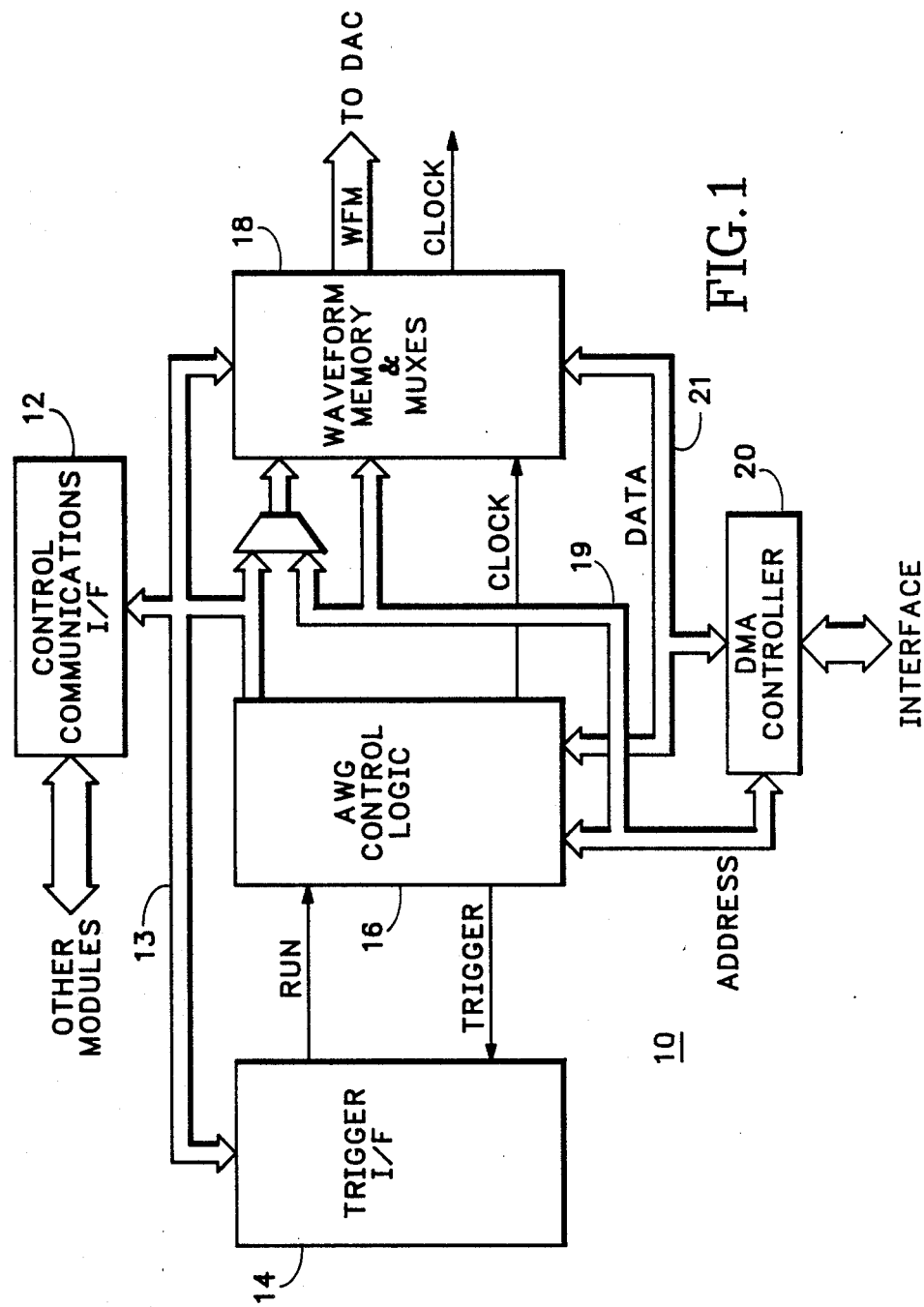
FIG. 1 is a block diagram of a portion of an instrument incorporating an arbitrary waveform generator according to the present invention.

Referring now to FIG. 1 a portion 10 of an instrument generates arbitrary waveforms. A control communications interface system 12 serves to provide control access between various modules within the instrument, including the arbitrary waveform generator. The communications interface system 12 interacts with a trigger interface system 14, an arbitrary waveform generator (AWG) logic circuit 16, and a waveform memory and multiplexer system 18. The trigger interface system 14 receives triggers from and transmits run commands to the AWG logic circuit 16. The AWG logic circuit 16 generates address commands for the memory portion of the waveform memory and multiplexer system 18, as well as providing a clock signal for the multiplexer portion. A direct memory access (DMA) controller 20 also interacts with the AWG logic circuit 16 and the waveform memory and multiplexer system 18 to load waveform data into the memory portion of the waveform memory and multiplexer system, and to load packet data into the AWG logic circuit, which data defines a desired arbitrary waveform to be generated. The DMA controller 20 is accessed via an appropriate interface. The waveform memory and multiplexer system 18 provides digitized waveform data to a digital to analog converter (DAC) according to the addresses received from the AWG logic circuit 16 to produce the desired analog waveform, and provides the clock signal to the remainder of the instrument, including the DAC.

Figure 2:
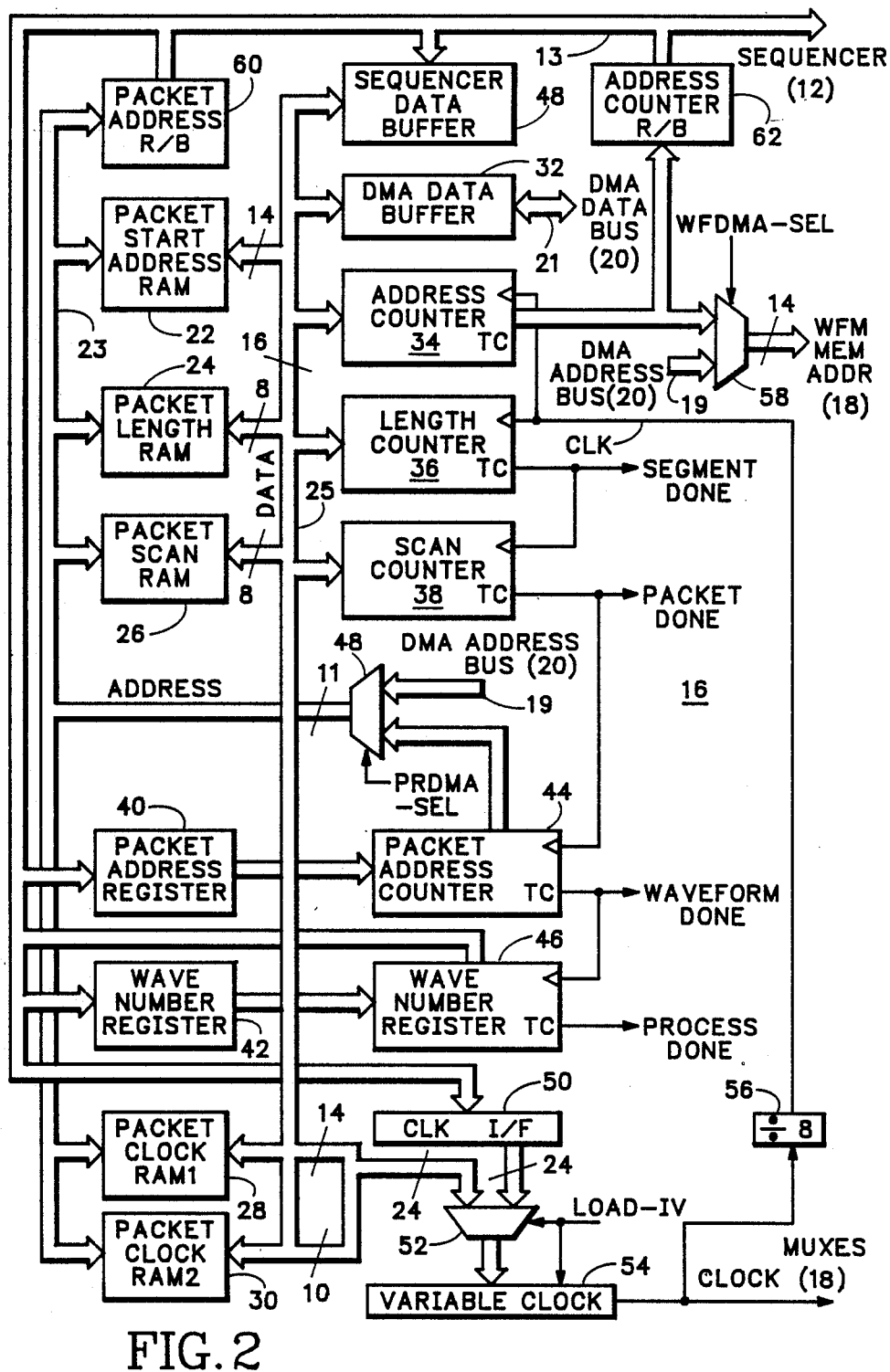
FIG. 2 is a block diagram of the arbitrary waveform generator according to the present invention.

The AWG logic circuit 16, as shown in FIG. 2, has a plurality of memory devices, such as random access memories (RAM), that contain various elements of a packet data word. Each packet data word defines a segment of the desired arbitrary waveform to be generated. The elements of the packet data word may include a starting address in the waveform memory, an ending address or length of the waveform segment being defined, a repetition number, and now a duration or clock frequency for the waveform segment. The AWG logic circuit 16 is connected to the communications interface system 12 by a communications bus 13, and to the DMA controller system 20 by DMA address and data buses 19, 21 respectively. The array of memory devices include a separate memory device for each packet data word element. The start address data is stored in a packet start address RAM 22, the length data is stored in a packet length RAM 24, the scan data is stored in a packet scan RAM 26, and the clock data is stored in two packet clock RAMs 28, 30. The packet data words may be stored sequentially in the RAMs for a desired waveform, or may be stored randomly. The memory devices are addressed via a packet address bus 23, and data is transferred to and from the memory devices via a packet data bus 25.

The DMA controller system 20 addresses the packet data word RAMs via the DMA address bus 19 over the packet address bus 23, and loads the packet data words in the RAMs via the DMA data bus 21 through a DMA data buffer 32 onto the packet data bus 25. Also connected to the packet data bus 25 are an address counter 34, a packet length counter 36 and a packet scan counter 38. A communications data buffer 40 is connected between the communications bus 13 and the packet data bus 25 to transfer data between the communications interface system 12 and the packet data word RAMs. Also connected to the communications bus 13 are a packet address register 40 and a wave number register 42 to receive information at the start of each waveform generation cycle, which information identifies the starting packet address and the number of iterations desired for the resulting generated waveform. The information from the packet address and wave number registers 40, 42 are transferred to respective counters 44, 46. The wave number counter 46 also is connected to the communications bus 13 to provide feedback to the communications 12 of the status of the waveform generation. The output of the packet address counter 44 is coupled through a packet multiplexer 48, to which also is input the address from the DMA address bus 19, to the packet address bus 23 so that the packet RAMs are either addressed by the DMA controller 20 for loading the packets, or by the packet address counter 44 for generating the waveform. The particular implementation shown addresses the packet RAMs sequentially, but by appropriate accessing by the communications interface system 12 the packet RAMs may be addressed randomly to generate the desired waveform.

A clock interface circuit 50 is connected to the communications bus 13 so that a variable clock 54, such as that used for timing and skew in the LT-1000 VLSI Logic Test System manufactured by Tektronix, Inc. of Beaverton, Oregon, may be controlled directly from the communications interface system 12. The output of the clock interface circuit 50 as well as the output from the packet clock RAMs 28, 30 are input to a clock multiplexer 52 so that for functions other than arbitrary waveform generation the communications interface system 12 controls the variable clock frequency, and for waveform generation the packet data word controls the variable clock frequency. The output of the variable clock 54 is the clock signal that is applied to the multiplexers of the waveform memory and multiplexer system 18 as well as to the remainder of the instrument, and is also applied via an optional divider circuit 56 to the clock inputs of the packet address and length counters 34, 36. The output of the packet address counter 34 is applied, together with addresses from the DMA address bus 19, to an address multiplexer 58 to address the memory portion of the waveform memory and multiplexer system 18 in order to load the appropriate waveform segments into the memory from the DMA controller system 20 or to output the addressed waveform segments to the DAC according to the packet address function. A packet address readback circuit 60 and an address counter readback circuit 62 are provided between the packet address bus 23 and the communications bus 13 and between the output of the packet address counter 34 and the communications bus to provide feedback to the communications interface system 12.

In operation the communications interface system 12 loads a starting packet address into the packet address register 40, and a number representing the number of iterations desired for the resulting generated waveform into the wave number register 42. The contents of the registers 40, 42 are transferred to their respective counters 44, 46, and the first packet address is applied to the packet address bus 23. The contents of the addressed packet data word is transferred into the respective counters 34, 36, 38, and the variable clock control word is applied via the clock multiplexer 52 from the packet clock RAMs 28, 30 to the variable clock 54. The start address from the packet address counter 34 is applied to the waveform memory and multiplexer system 18 via the address multiplexer 58 to access the first data point for the desired waveform from the memory portion for transmission to the DAC. For each clock pulse from the variable clock 54 the packet address counter 34 is incremented and the packet length counter 36 is effectively decremented. When the length counter 36 overflows, indicating that the waveform segment represented by that packet data word is complete, the packet scan counter 38 is effectively decremented, and the start address from the packet address RAM 22 and the length from the packet length RAM 24 are reloaded into the packet address and length counters 34, 36 to repeat the waveform segment represented by that packet data word.

When the packet scan counter 38 overflows, indicating that the repetition of that packet data word is completed, the packet address counter 44 is incremented to access the next packet data word for the desired waveform, and the process is repeated as described above. When the complete waveform has been generated, an overflow from the packet address counter 44 effectively decrements the wave number counter 46, the packet address counter 44 is reloaded from the packet address register 40, and the waveform is generated again as described above. When the desired number of repetitions of the complete waveform is completed, then an overflow from the wave number counter 46 indicates that the process has been completed, and the communications interface system 12 then sequences to the next module to continue the testing by the instrument.

As a comparable illustration, suppose the desired test waveform is a variable frequency sine wave having ten cycles of a sine wave segment at each of ten frequencies, each sine wave segment being twenty data points in length. Then the packet data words loaded into the packet RAMs 22, 24, 26, 28, 30 by the DMA controller system 20 would have a start address corresponding to the memory address in the waveform memory and multiplexer system 18 at which the twenty point sine wave segment begins. The length would be twenty to obtain the complete sine wave, and the scan value would be ten since that is the number of cycles of the sine wave desired at each frequency. The clock control word would have a value that would cause the variable clock 54 to operate at the desired frequency for that frequency segment of the desired waveform. The communications interface system 12 then loads a starting packet address into the packet address register 40 and an iteration number into the wave number register 42, which values are subsequently transferred to the respective counters 44, 46 when the waveform generation starts. The first addressed data packet then is processed to produce the first sine wave at a first frequency, and is repeated ten times, and then the packet address is incremented and the next packet data word is executed to produce another ten cycles of the sine wave at a second frequency. At the conclusion of the sequence of packet data words a complete waveform having a plurality of ten cycle sine waves at different frequencies is produced. This complete waveform is repeated ten times according to the waveform iteration number in the waveform number counter 46, and then the arbitrary waveform generation is terminated until a new sequence of packet data words is loaded from the DMA controller system 20 and accessed by the communications interface system 12, or the communications interface system again accesses the current sequence of packet data words.

Thus the present invention provides an arbitrary waveform generator with adjustable spacing for each segment of a generated waveform by using a control word in a packet data word that determines the frequency of a variable clock, and therefore the duration for each waveform segment represented by the corresponding packet data word.

WHAT IS CLAIMED IS:

1. An arbitrary waveform generator of the type having waveform segments stored in a memory and having a desired waveform represented by a plurality of packet data words, each packet data word having a plurality of elements, comprising:
    means for storing each element, one element being a clock control word;
    means for generating a sequence of addresses for the memory to access a particular waveform segment determined by each packet data word according to the elements in the storing means, the rate at which the sequence of addresses is generated being determined by a clock signal; and
    means for varying a clock frequency for each packet data word according to the clock control word to produce the clock signal so that the duration of each waveform segment is adjusted to produce the desired waveform.

2. An arbitrary waveform generator as recited in claim 1 wherein the storing means comprises a plurality of storage devices, at least one for each element, having a common address bus and a common data bus, the common data bus coupling the storage devices to the generating means.

3. An arbitrary waveform generator as recited in claim 2 wherein the generating means comprises means coupled to the common data bus for incrementing a start address, a length value and a segment repetition value transferred from the respective storage devices, the start address and length value incrementing means being incremented by the clock signal and the segment repetition value incrementing means being incremented by a length overflow signal from the length value incrementing means, the length overflow signal also initializing the start address and length value incrementing means to the start address and length value until the segment repetition value incrementing means produces a packet complete overflow signal.

4. An arbitrary waveform generator as recited in claim 1 wherein the varying means comprises a variable clock having a master clock and the clock control word from the storing means as inputs and having the clock signal as an output, the clock signal being a function of the clock control word.

5. An arbitrary waveform generator as recited in claim 1 further comprising means for sequencing through the packet data words to generate a desired waveform as a sequence of the desired waveform segments from the packet data words.

6. An arbitrary waveform generator as recited in claim 5 further comprising means for repeating the desired waveform for a predetermined number of iterations to produce a test waveform.

7. An arbitrary waveform generator as recited in claim 6 wherein the storing means comprises a plurality of addressable storage devices coupled to a packet address bus and to a packet data bus, elements of the packet data words being stored separately each in at least one of the addressable storage devices, the packet data bus coupling the storage devices to the clock signal and addresses generating means.

8. An arbitrary waveform generator as recited in claim 7 wherein the clock signal generating means comprises a variable clock having as inputs a master clock signal and the clock control word from the storing means to produce the clock signal.

9. An arbitrary waveform generator as recited in claim 8 wherein the address generating means comprises:
    means for sequencing addresses in response to the clock signal starting from a memory start address from the storing means; and
    means for indicating when a waveform segment for the packet data word is complete according to a memory end address determined by a data point length value from the storing means.

10. An arbitrary waveform generator as recited in claim 9 wherein the address generating means further comprises means for repeating the waveform segment by reinitializing the sequencing and indicating means to the memory start address and the data point length value, respectively, to repeat the addresses generated by the addresses generating means until the desired waveform segment is produced.

11. An arbitrary waveform generator as recited in claim 10 wherein the packet data word sequencing means comprises:
    means coupled to the packet address bus for providing a packet data word address to the storing means;
    means coupled to the providing means for initializing the providing means with a start packet data word address as the packet data word address; and
    means for stepping the packet data word address to a next packet data word address after each desired waveform segment is complete until the desired waveform is complete.

12. An arbitrary waveform generator as recited in claim 11 wherein the desired waveform repeating means comprises:
    means for counting the number of desired waveforms completed; and
    means for indicating that the test waveform is complete when a predetermined number of desired waveforms are counted by the counting means.

13. An arbitrary waveform generator of the type having waveform segments stored in a memory as sequences of data points, and having desired waveforms defined by sequences of packet data words, comprising:
  means for storing the packet data words, an element of each packet data word being a clock control word;
  means for generating a clock signal for each packet data word that has a frequency determined by the clock control word for that packet data word; and
  means for generating addresses for the memory to generate a desired waveform segment from each packet data word at a rate determined by the clock signal.

* * * * *